(12) United States Patent
Ma et al.

(10) Patent No.: US 11,668,856 B2
(45) Date of Patent: *Jun. 6, 2023

(54) PREDICTING CLIMATE CONDITIONS BASED ON TELECONNECTIONS

(71) Applicant: Mineral Earth Sciences LLC, Mountain View, CA (US)

(72) Inventors: Hongxu Ma, Mountain View, CA (US); Kunxiaojia Yuan, Albany, CA (US); Fa Li, Albany, CA (US); Charlotte Leroy, Redwood City, CA (US); Grigory Bronevetsky, San Ramon, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,448

(22) Filed: Jan. 3, 2022

(65) Prior Publication Data

US 2022/0120934 A1 Apr. 21, 2022

Related U.S. Application Data

(63) Continuation of application No. 16/911,278, filed on Jun. 24, 2020, now Pat. No. 11,243,332.

(51) Int. Cl.
*G01W 1/10* (2006.01)
*G06N 20/00* (2019.01)
(Continued)

(52) U.S. Cl.
CPC ............... *G01W 1/10* (2013.01); *G01W 1/02* (2013.01); *G01W 1/14* (2013.01); *G06N 20/00* (2019.01)

(58) Field of Classification Search
None
See application file for complete search history.

(56) References Cited

U.S. PATENT DOCUMENTS

| 8,645,304 B2 | 2/2014 | Jiang et al. |
| 11,243,332 B2 * | 2/2022 | Ma .......................... G01W 1/02 |

(Continued)

FOREIGN PATENT DOCUMENTS

| CN | 109886496 | 6/2019 |
| WO | 2018198267 | 11/2018 |

OTHER PUBLICATIONS

Schaeffer et al.; An initial validation of Landsat 5 and 7 derived surface water temperature for U.S. lakes; reservoirs, and estauaries; International Journal of Remote Sensing; 39:22; 7789-7805; dated 2018.

(Continued)

*Primary Examiner* — Roy Y Yi
(74) *Attorney, Agent, or Firm* — Gray Ice Higdon (57) ABSTRACT

Implementations are described herein for predicting a future climate condition in an agricultural area. In various implementations, a teleconnection model may be applied to a dataset of remote climate conditions such as water surface temperatures to identify one or more of the most influential remote climate conditions on the future climate condition in the agricultural area. A trained machine learning model may be applied to the one or more most influential remote climate conditions and to historical climate data for the agricultural area to generate data indicative of the predicted future climate condition. Based on the data indicative of the predicted future climate condition, one or more output components may be caused to render output that conveys the predicted future climate condition.

20 Claims, 6 Drawing Sheets

(51) Int. Cl.
*G01W 1/02* (2006.01)
*G01W 1/14* (2006.01)

(56) References Cited

U.S. PATENT DOCUMENTS

| | | |
|---|---|---|
| 2013/0024118 A1 | 1/2013 | Gershunov et al. |
| 2015/0193713 A1 | 7/2015 | Giunta et al. |
| 2016/0217228 A1 | 7/2016 | Mewes et al. |
| 2018/0211156 A1 | 7/2018 | Guan et al. |
| 2020/0125929 A1 | 4/2020 | Guo et al. |

OTHER PUBLICATIONS

Charakopoulos et al.; Dynamics and causalities of atmospheric and oceanic data identified by complex networks and Granger cuasality analysis; Physica A: Statistical Mechanics and its Application; vol. 495; pp. 436-453 dated 2018.

Mohammadrezaei, M. et al., "Evaluating the effect of ocean-atmospheric indices on drought in Iran;" Theoretical and Applied Climatology, vol. 140, pp. 219-230; Jan. 4, 2020.

European Patent Office; International Search Report and Written Opinion of Ser No. PCT/US2021/026003; 13 pages dated Jul. 2, 2021.

Granger, C. W.; Investigaging Causal Relations by Econometric Models and Cross-spectral Methods; Econometrica, vol. 37, No. 3; pp. 424-438; dated Aug. 1969.

Runge, J. et al.; Inferring Causation from Time Series in Earth System Sciences; Nature Communications; 13 pages; dated 2019.

Runge, J. et al.; Identifying Causal Gateways and Mediators in Complex Spatio-temporal Systems; Nature Communications; 10 pages; dated 2015.

Schreiber, T.; Measuring Information Transfer; Max Planck Institute for Pysics of Complex Systems; pp. 1-4; dated Jan. 19, 2000.

\* cited by examiner

PREDICTING CLIMATE CONDITIONS BASED ON TELECONNECTIONS

BACKGROUND

Accurately predicting local climate conditions can be useful for a variety of reasons. Suppose it is predicted that an agricultural area—e.g., a county, state, territory or region such as a wine region, etc.—is going to receive less precipitation than usual over the next month. Farmers can plan accordingly, e.g., by selecting drought-resistant crops or by upgrading or installing more comprehensive irrigation systems. However, it is difficult to accurately predict local climate conditions because there are myriad contributing factors, some local, others faraway. For example, sea surface temperatures and/or atmospheric pressure in one portion of an ocean may heavily influence precipitation levels over a faraway land region weeks or even months later.

SUMMARY

Implementations are described herein for applying a teleconnection model to identify a causal connection or correlation ("teleconnection") between a source dataset—such as water surface temperatures at one or more "cells" or "grids" of a body of water at some previous time period—and a target dataset such as data indicative of a climate condition within a particular agricultural area of interest. Implementations are further described herein for using the identified teleconnection(s) along with historical climate data that is local to the agricultural area of interest to predict various climate conditions in the agricultural area of interest.

In various implementations, a teleconnection model may be used to select features such as water surface temperatures at some time lag into the past that are most influential on a targeted climate condition in an agricultural area of interest. These selected features may be highly correlated with the targeted climate condition in the agricultural area of interest. Accordingly, these selected features may be applied as inputs to a trained machine learning model, along with historical climate data for the agricultural area of interest, to generate data indicative of a predicted climate condition in the agricultural area.

This trained machine learning model may take various forms. In some implementations, the machine learning model may be specifically trained to predict a climate condition in a particular agricultural area. In other words, different machine learning models may be trained for different agricultural areas.

In some implementations, the machine learning model may be a time-series model such as a recurrent neural network ("RNN"), long short-term memory ("LSTM") network, a gated recurrent unit ("GRU") network, etc. The inputs to such a model, including the historical climate data for the agricultural area, may thus be time-series data, such as periodic temperature samples, periodic precipitation samples, or other periodic climate condition samples. In some implementations, the input time-series data may also include historical samples of the climate condition targeted for prediction. For instance, if the targeted climate condition is the Palmer Drought Severity Index ("PDSI"), then the input data applied during each iteration or "lag" of the time-series model may also include an observed PDSI at that time.

The teleconnection model may be generated to identify causal relationships between source and target datasets, as described previously. As one example, for a time lag of −3 months, the teleconnection model may identify a teleconnection between surface temperatures of a portion of the Northern Atlantic Ocean three months in the past and a current PDSI of negative 2 in the Ohio Valley region of the United States. Intuitively, sea surface temperature of this portion of the Northern Atlantic is highly influential on the PDSI of the Ohio Valley region three months later. However, if the time lag were changed to −2 (two months ago), for instance, the most influential region for the Ohio Valley region may shift, e.g., to a different portion of the Northern Atlantic, to a portion of the Southern Atlantic, etc.

Once these myriad causal connections are established, in some implementations, they may be used in reverse (akin to a reverse lookup table) to identify portions (e.g., cells, grids) of the Ocean that are most influential to an agricultural area of interest at a particular time lag. For example, the PDSI of the Ohio Valley at a time lag of −3 may be used as an input to the teleconnection model to determine which portion(s) of the Northern Atlantic Ocean were most influential. These portion(s) of the Northern Atlantic Ocean may then be applied as inputs to the machine learning model (along with historical climate data for the agricultural area) as described previously to predict future PDSI. Put another way, there are numerous sea surface temperatures across the entire plant at any moment in time. The teleconnection model may be used to narrow the search space and facilitate selection of the most influential features for predicting the future climate condition.

In some implementations, the teleconnection model may rely on and/or implement multiple types of causal analysis. For example, application of the teleconnection model may cause multiple different sets of one or more candidate water surface temperatures to be generated, each corresponding to a different type of causal analysis. These types of causal analysis may include but are not limited to convergent cross mapping ("CCM"), transfer entropy, and Granger causality. The actual water surface temperatures that are ultimately selected for application across the machine learning model may be selected from these candidate water surface temperatures in various ways, such as an intersection or union of two or three sets of candidates, as a weighted combination, etc. In some implementations, it may be determined, e.g., empirically, that one type of causal analysis is more accurate than others for a target agricultural area, in which case candidates from that causal analysis may be weighted more heavily.

While many implementations described herein rely on sea surface temperatures (or more generally, water surface temperatures), this is not meant to be limiting. In other words, teleconnections to target datasets may be established from source datasets other than water surface temperatures. For example, atmospheric temperatures and/or pressure over one region of an ocean (or even over a different region of land) may influence another climate condition over a particular agricultural area of interest sometime in the future. Sea surface pressures may also be considered as source datasets.

In some implementations, a method for predicting a future climate condition in an agricultural area may be implemented using one or more processors and may include: applying a teleconnection model to a dataset of water surface temperatures (or more generally, any remote climate condition) to identify one or more most influential water surface temperatures on the future climate condition in the agricultural area; applying a trained machine learning model to the one or more most influential water surface temperatures and to historical climate data for the agricultural area to generate data indicative of the predicted future climate condition; and based on the data indicative of the predicted future climate condition, causing one or more output components to render output that conveys the predicted future climate condition.

In various implementations, the trained machine learning model may be a time-series model, the historical climate data for the agricultural area may be time-series data, and applying the teleconnection model to the dataset of water surface temperatures may include applying the teleconnection model a plurality of times to generate multiple sets of one or more of the most influential water surface temperatures. Each set of the multiple sets may correspond to a time lag prior to a target time for the predicted future climate condition.

In various implementations, applying the teleconnection model may generate multiple different sets of one or more candidate water surface temperatures, with the multiple sets corresponding to multiple different types of causal analysis. In various implementations, the multiple different types of causal analysis may include two or more of convergent cross mapping, transfer entropy, or Granger causality. In various implementations, the one or more most influential water surface temperatures may be selected from an intersection or union of the multiple different sets of one or more candidate water surface temperatures.

In various implementations, the method may include assigning more weight to one or more candidate water surface temperatures from one of the multiple different sets than one or more candidate water surface temperatures from another of the multiple different sets. In various implementations, the assigning may be based on empirical data associated with the agricultural area.

In various implementations, the machine learning model may be trained specifically to predict the future climate condition in the agricultural area. In various implementations, the climate condition may include one or more of: a measure of drought in the agricultural area; humidity in the agricultural area; temperature in the agricultural area; or precipitation in the agricultural area. In various implementations, applying the teleconnection model may include using a past observation of the climate condition as an input to the teleconnection model.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
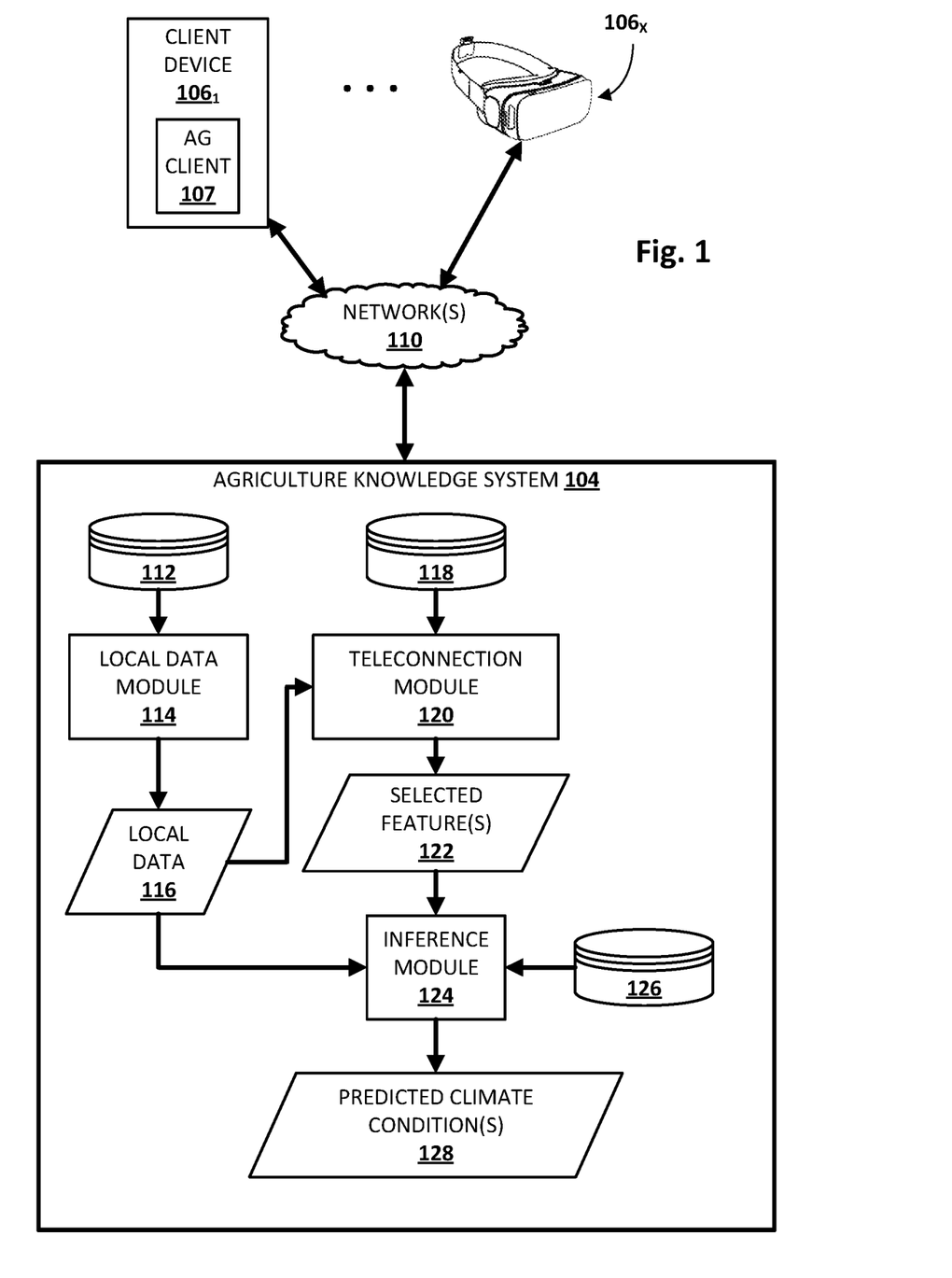
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes various components that may be configured to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc. Various components depicted in FIG. 1 and elsewhere may be implemented using any combination of hardware and software.

An individual or "user" may operate one or more client devices $106_{1-X}$ to interact with other components depicted in FIG. 1, such as an agricultural knowledge system 104. A client device 106 may be, for example, a desktop computing device, a laptop computing device, a tablet computing device, a mobile phone computing device, a computing device of a vehicle of the participant, a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Agricultural knowledge system 104 is an example of an information system in which the techniques described herein may be implemented. Each of client devices 106 and agricultural knowledge system 104 may include one or more memories for storage of data and software applications, one or more processors for accessing data and executing applications, and other components that facilitate communication over a network. The operations performed by client device 106 and/or agricultural knowledge system 104 may be distributed across multiple computer systems.

Each client device 106 may operate a variety of different applications that may be used to perform various agricultural tasks, such as crop yield prediction and/or diagnosis, climate condition prediction (e.g., for crop planning), etc. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, components of agricultural knowledge system 104 may perform selected aspects of the present disclosure to predict climate condition(s) in an agricultural area of interest. These predictions may inform the agricultural personnel of a likely climate condition of an agricultural area sometime in the future, e.g., so that the personnel may take affirmative action to, for instance, select suitable crops, increase/decrease irrigation, increase crop yield in general, minimize crop loss, etc.

As used herein, an "agricultural area of interest" or simply "agricultural area" may refer to a geographic area or region that is subject to generally homogenous or uniform climate conditions, e.g., compared to other regions nearby or faraway. As one example, an agricultural area may encompass an area that is influenced by a particular teleconnection, at least at a particular time lag. An agricultural area may be of varying sizes depending on how widespread the homogenous climate conditions are. For example, a particular valley that extends across a state or county may experience relatively uniform climate conditions along its length. Accordingly, a particular crop grown in one area of the valley will likely generate a similar crop yield as the same crop grown in another area of the valley—assuming other human-dictated stewardship parameters such as fertilizer application, irrigation, etc., are held constant. Other examples of agricultural areas may include, but are not limited to, regions known for growing grapes suitable for particular wines, regions known for grown particular types of crops such as potatoes, and so forth.

In various implementations, agricultural knowledge system 104 may be implemented across one or more computing systems that may be referred to as the "cloud." Agricultural knowledge system 104 may include a local data module 114 that is configured to provide, from a historical climate database 112 to downstream component(s), local climate data 116 corresponding to an agricultural area. Although shown as part of a centralized cloud infrastructure in FIG. 1, in some implementations, historical climate database 112 (and/or local data module 114) may be distributed across multiple different locations. For example, instances of database 112 and/or module 114 may be maintained locally within and/or near each agricultural area of interest, e.g., by local farmers or co-ops, commercial agricultural entities, government departments of agriculture, etc.

Local climate data 116 retrieved from historical climate database 112 may come in various forms and may include a wide variety of data about the agricultural area of interest. Local climate data 116 may include, for instance, soil moisture measurement(s), weather data such as precipitation, humidity, wind, sunlight exposure, and other similar data associated with an agricultural area of interest. In some implementations, local climate data 116 may include time-series data, such as periodic soil moisture measurements, recorded weather events over time, precipitation over time, sunlight exposure over time, etc. In some implementations, local climate data 116 may include historical climate conditions observed in an agricultural area of interest. These historical climate conditions may or may not correspond to the climate condition(s) that are ultimately being predicted using techniques described herein.

Agricultural knowledge system 104 may also include a teleconnection module 120 that is operably coupled with a remote climate database 118. Teleconnection module 120 may be configured to select climate features 122 from remote climate database 118 that are applicable to a remote agricultural area of interest (hence the name, "remote" climate database). In particular, teleconnection module 120 may identify a teleconnection (e.g., mapping) that associates particular climate features 122 in database 118 with the remote agricultural area of interest, e.g., for a given time lag. As explained previously, these climate features 122 selected by teleconnection module 120 from remote climate database 118 may be heavily predictive and/or highly influential of climate conditions in the remote agricultural area of interest some time lag later (e.g., weeks or month(s) later).

In some implementations, remote climate database 118 may include information about water surface temperatures (also referred to as "sea surface temperatures") across one or more bodies of water. In some implementations, bodies of water such as the Earth's oceans and seas (and lakes if large enough) may be logically divided into a grid of cells, e.g., with each cell having a size of x km by x km each (with x being a positive integer). Remote climate database 118 may include water surface temperatures observed in each of these predefined cells. In some such implementations, the cells may be defined so that each cell includes relatively homogenous water surface temperatures throughout. In some implementations, if multiple sample temperatures are obtained from a single logical cell, then an average of those sampled temperatures may be used for the whole cell.

Remote climate database 118 is not limited to water surface temperatures. In some implementations, remote climate database 118 may include other types of climate predictions that may be influential on remote agricultural areas after various time lags. For example, in addition to or instead of water surface temperature, atmospheric pressures at various points over a body of water or over land (e.g., in the predefined cells mentioned previously) may influence climate conditions of the agricultural area of interest after various time lags. Additionally or alternatively, sea surface pressure in various areas, such as the predefined cells mentioned previously, may also influence climate condition(s) in the agricultural area of interest after some time lag. These are just examples, and other climate parameters of oceans may also be considered.

Teleconnection module 120 may select climate features 122 from remote climate database 118 in various ways. In some implementations, teleconnection module 120 may select climate features using a desired time lag (e.g., one month ago or −1, two months ago or −2, etc.) and/or one or more features of local climate data 116. For example, a historical climate condition observed in an agricultural area of interest may be used as input for teleconnection module 120 to identify one or more ocean cells. Water surface temperatures in these cells may have been highly influential in causing that historical climate condition observed in the agricultural area of interest.

Inference module 124 may be configured to apply machine learning models stored in a machine learning model database 126 to local climate data 116 and features 122 selected by teleconnection module 120. Based on this application, inference module 124 may generate data indicative of predicted climate condition(s) 128 of agricultural areas of interest. Various types of machine learning models may be trained to predict climate conditions in accordance with various aspects of the present disclosure. In some implementations, a time-series machine learning model such as a recurrent neural network ("RNN"), long short-term memory ("LSTM") network, a gated recurrent unit ("GRU") network, a transformer network, etc., may be employed to generate climate condition predictions based on time-series data.

In some implementations, different machine learning models may be trained for different agricultural areas of interest. For example, one time-series machine learning model may be trained for Napa Valley in California. Another time-series machine learning model may be trained for Burgundy territory of France. Another machine learning model may be trained for a homogenous agricultural area in the American Midwest. And so on. In this specification, the term "database" and "index" will be used broadly to refer to any collection of data. The data of the database and/or the index does not need to be structured in any particular way and it can be stored on storage devices in one or more geographic locations.

Figure 2:
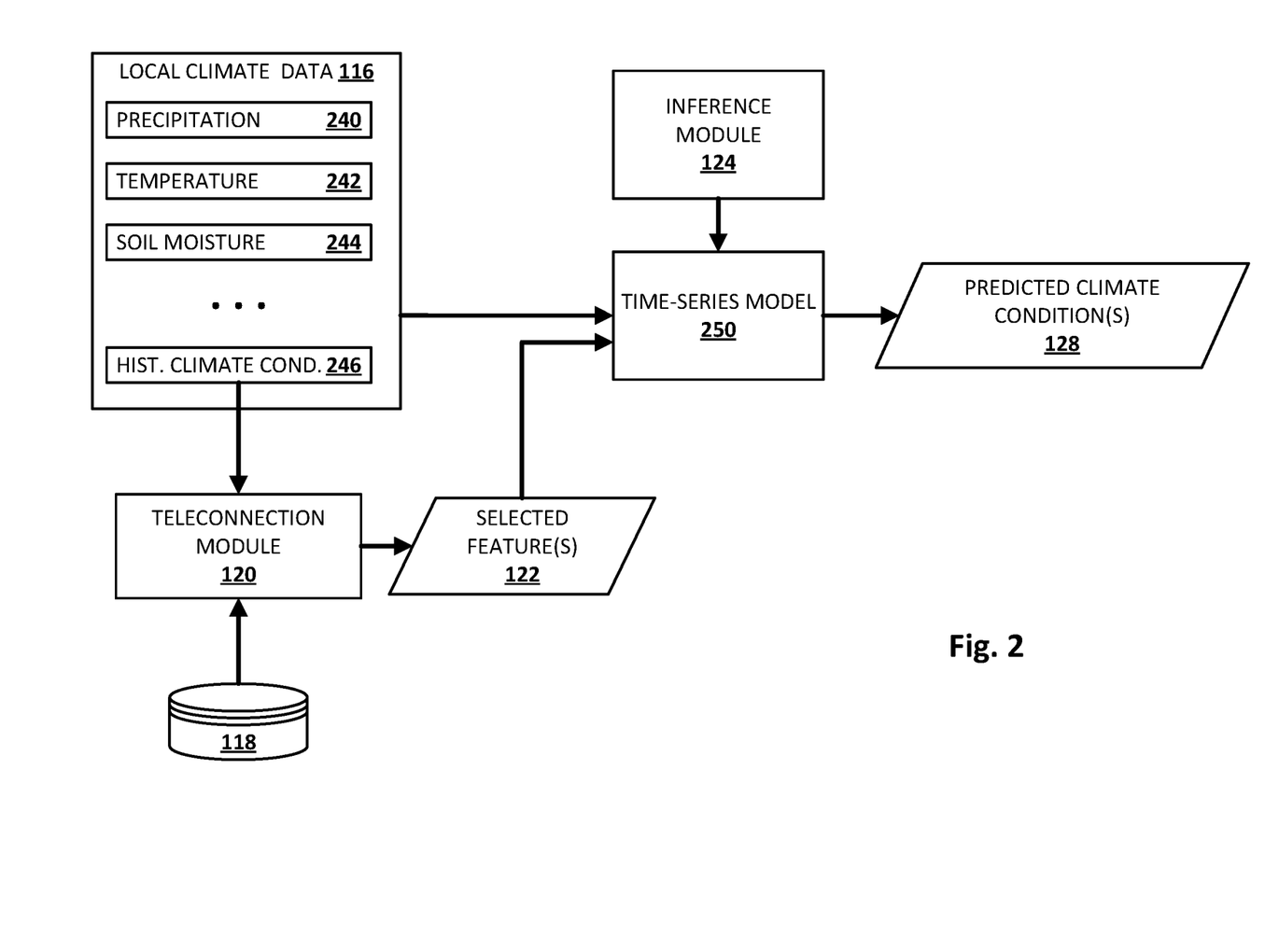
FIG. 2 schematically depicts components and a data flow that can be implemented to practice selected aspects of the present disclosure, in accordance with various implementations.

FIG. 2 depicts an example process flow for practicing selected aspects of the present disclosure. Starting at top left, local climate data 116 for an agricultural area of interest may include, for instance, precipitation data 240, temperature data 242, soil moisture data 244, any as indicated by the ellipses, various other types of data relating to climate conditions such as humidity, sunlight exposure, wind exposure, etc. Local climate data 116 may also include one or more historical climate conditions 246 observed in the agricultural area of interest. These may include conditions such as PDSI, predicted precipitation, predicted temperature, predicted humidity, etc. As noted previously, local climate data 116 may include time-series data in many implementations.

In FIG. 2, teleconnection module 120 retrieves the historical climate condition 246 and uses it to select various features 122 from remote climate database 118. These selected features 122 and local climate data 116 may then be processed by inference module 124 using a time-series machine learning model 250 to generate predicted climate condition(s) 128. In some implementations, the predicted climate condition(s) 128 may include predictions of the same historical climate conditions 246 observed in the agricultural area of interest in the past, except in the future. For example, historical climate conditions 246 may include PDSI observed one month prior, two months prior, three months prior, etc. The predicted climate condition(s) 128 may include PDSI expected one month (lag=-1) in the future, two months (lag=-2) in the future, etc.

Figure 3:
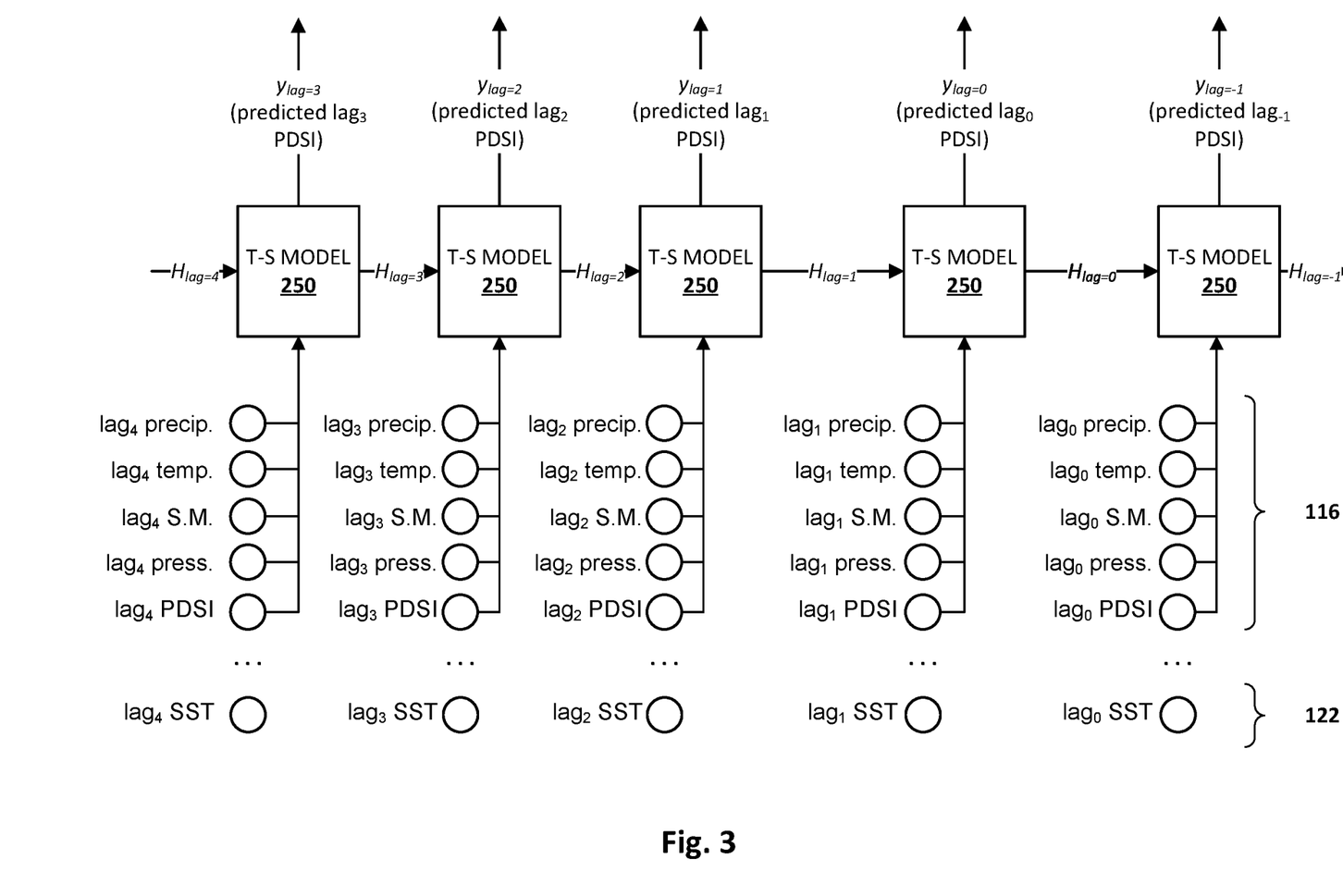
FIG. 3 schematically depicts how a time-series machine learning model may be used with selected aspects of the present disclosure.

FIG. 3 depicts time-series ("T-S") model 250 such as an RNN, LSTM, GRU, etc., in an "unfolded" state to demonstrate how it may be implemented to predict a future climate condition $y_{lag=-1}$ (visible at upper right), which was denoted with the reference numeral 128 in previous figures. It should be understood that in various implementations, time-series model 250 may be a single model (or pipeline of models) that is applied during each of multiple iterations.

Similar to FIG. 2, in FIG. 3, during iteration or "lag" i (which will be assumed to be one-month increments for this example, but that is not meant to be limiting), local climate data 116 associated with the agricultural area of interest is retrieved, and may include, for instance, $lag_i$ precipitation ("precip."), $lag_i$ temperature ("temp."), $lag_i$ soil moisture ("SM"), $lag_i$ local atmospheric pressure, ("press."), $lag_i$ PDSI, and as indicated by the ellipsis, any number of other local climate data points. Also during each lag=i, features 122 selected by teleconnection module 120 may include $lag_i$ sea surface temperatures ("SST").

At each lag=i, time-series model 250 is applied, e.g., by inference module 124, to process data $H_{lag=i+1}$ from a previous iteration/lag, as well as local climate data 116 and features 122 selected by teleconnection module 120 for the current iteration lag=i. And at each lag=i, a climate prediction $y_{lag=i-1}$ (e.g., prediction for the next month) is output as well. For example, at lag=4 on the far left, $H_{lag=5}$ (which may be null if there are no previous iterations), local climate data 116, and SST 122 features for $lag_4$ (i.e. four months in the past) are applied across time-series model 250 to generate climate prediction $y_{lag=3}$, which may be a prediction of a climate condition such as PDSI for a month later (i.e. three months in the past). At lag=3 second from left, local climate data 116 and SST 122 features for $lag_3$ (i.e. three months in the past) are applied across time-series model 250 to generate climate prediction $y_{lag=2}$, which may be a prediction of a climate condition such as PDSI for a month later (i.e. two months in the past). And so on.

Note that the predicted $lag_i$ PDSI at top is not necessarily the same as the $lag_i$ PDSI that is provided as input during the next iteration. The latter may be an observed, rather than predicted, $lag_i$ PDSI. In fact, these values may be used to train time-series model 250 in some cases. For example, a predicted $lag_i$ PDSI that is output during one iteration may be compared to a $lag_i$ PDSI that is observed during a following iteration to determine an error. This error may be used to train time-series model 250, e.g., using techniques such as gradient descent, back propagation, etc.

Referring back to FIG. 3, this process may continue until lag=0, i.e. the present, which is far right in FIG. 3. In lag=0, local climate data 116 and SST 122 features for the present (i.e. zero months in the past) are applied across time-series model 250 to generate climate prediction $y_{lag-1}$, which may be a prediction of a climate condition such as PDSI a month from now (i.e. -1 months in the past, which really means one month in the future).

Figure 4:
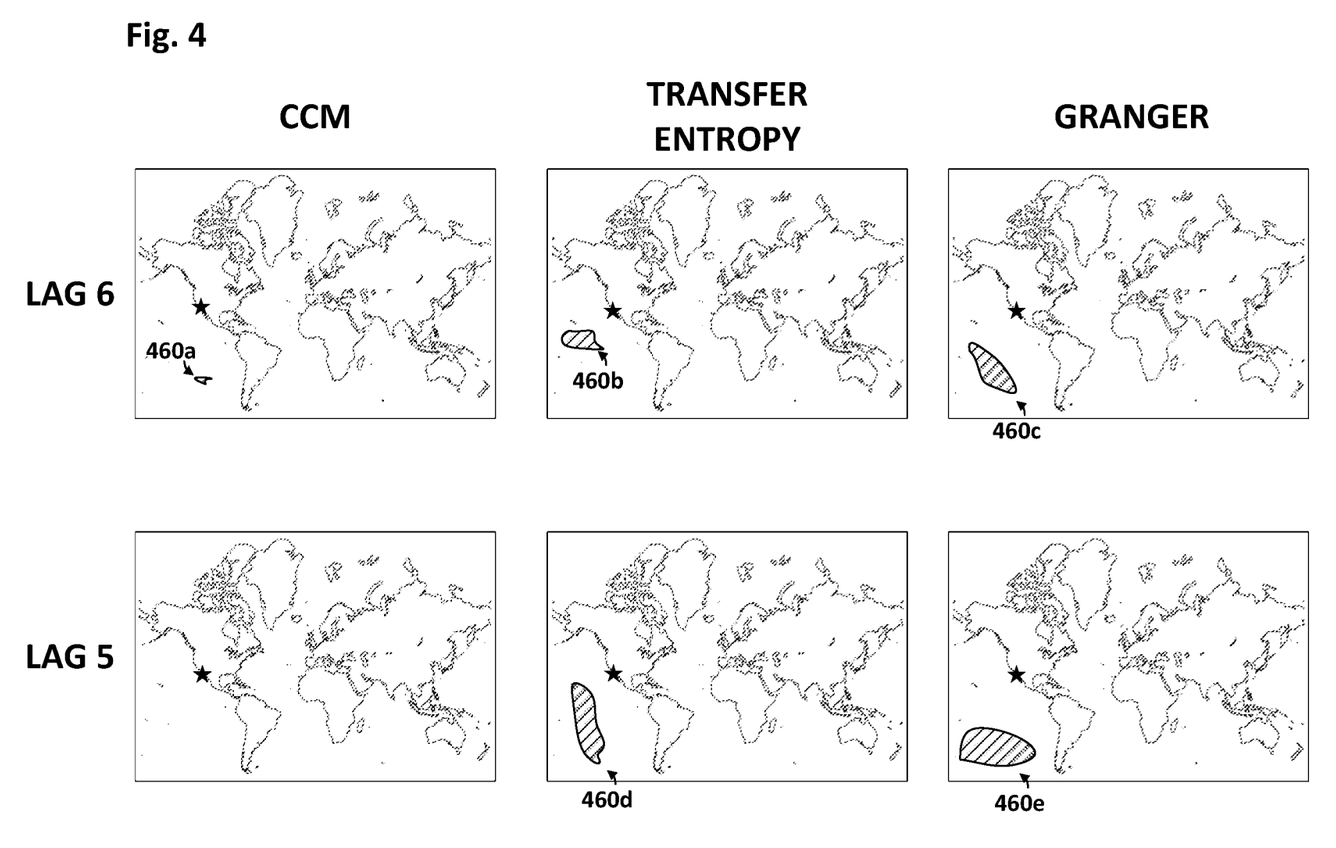
FIG. 4 depicts examples of how multiple different types of causal analysis may be employed to obtain more accurate climate predictions, in accordance with various implementations.

FIG. 4 depicts six maps that illustrate how teleconnection module 120 may apply three different types of causal analysis to identify different cell clusters or "sets" (generally, 460) of oceans. These clusters/sets 460 may contain individual cells that are the most influential (e.g., from a sea surface temperature perspective) for an agricultural area denoted with a star, which corresponds roughly to southern California. Sets/clusters identified at two different lags, six months in the past (LAG SIX) and five months in the past (LAG 5), are shown in the top and bottom rows, respectively. The three types of causal analysis are, from left to right, convergent cross mapping ("CCM"), transfer entropy, and Granger causality.

In the top row (LAG 6), CCM identifies a small cluster 460a of cells in the southern Pacific Ocean. According to CCM causal analysis, the cells in this cluster 460a—and more particularly, sea surface temperatures observed in these cells six months in the past—are the most influential on local climate conditions in southern California today.

In the second column of the top row (LAG 6), cross entropy causal analysis identifies a slightly larger cluster 460b of cells situated somewhat north of cluster 460a. According to cross entropy causal analysis, the cells in this cluster 460b—and more particularly, sea surface temperatures observed in these cells six months in the past—are the most influential on local climate conditions in southern California today.

In the right-most column of the top row (LAG 6), Granger causal analysis identifies another even larger cluster 460c of cells situated somewhat south of cluster 460b. According to Granger causal analysis, the cells in this cluster 460c—and more particularly, sea surface temperatures observed in these cells six months in the past—are the most influential on local climate conditions in southern California today.

In the leftmost column of the bottom row (LAG 5), CCM does not identify any cells that are sufficiently influential. Put another way, according to CCM causal analysis, there were no observed sea surface temperatures five months in the past that are sufficiently influential on climate conditions in southern California today.

In the second column of the bottom row (LAG 5), cross entropy causal analysis identifies a relatively large cluster 460*d* of cells situated across a wide longitudinal swath of the Pacific Ocean. According to cross entropy causal analysis, the cells in this cluster 460*d*—and more particularly, observed sea surface temperatures in these cells five months in the past—are the most influential on local climate conditions in southern California today.

In the right-most column of the bottom row (LAG 5), Granger causal analysis identifies another relatively large cluster 460*e* of cells that extends more east-west than cluster 460*d*. According to Granger causal analysis, the cells in this cluster 460*e*—and more particularly, observed sea surface temperatures in these cells five months in the past—are the most influential on local climate conditions in southern California today.

As shown in FIG. 3, each type of causal analysis may, at each lag, identify a different cluster (or "set") of cells in the Pacific Ocean that are—at least according to the respective causal analysis—highly influential on climate conditions in southern California. In some implementations, these sets may contain cells that have water surface temperatures (or other remote predictors such as atmospheric pressure, water pressure, etc.) that may be deemed "candidates" for selection by teleconnection module 120. In various implementations, teleconnection module 120 may select one or more of the most influential water surface temperatures from these disparate sets of candidate water surface temperatures in various ways.

In some implementations, different cells within individual clusters 460 may have different weights assigned to them, such that the cluster might resemble a heat map if visually annotated based on these weights. For examples, cells near the center of a cluster may be weighted more heavily than cells near the edge because the center cells are likely more influential than those near the edge. In some implementations, teleconnection module 120 may take these weights into account when selecting cells having influential water surface temperatures.

In some implementations, teleconnection module 120 may select those candidate water surface temperatures that are part of an intersection of the multiple different sets of candidate water surface temperatures generated by the multiple different causal analyses. In some implementations, teleconnection module 120 may select any candidate water surface temperatures that are part of a union of the multiple different sets of candidate water surface temperatures generated by the multiple different causal analyses.

In some implementations, teleconnection module 120 may assign more weight to one or more candidate water surface temperatures from one of the multiple different sets than one or more candidate water surface temperatures from another of the multiple different sets. This assigning may be based on empirical data associated with the agricultural area of interest. For example, it may be observed empirically that, for the targeted agricultural area (southern California in FIG. 4), the cluster 460*a* identified by CCM analysis at LAG 6 is not as accurate as the clusters 460*b* and 460*c* identified by the other two types of causal analysis. Accordingly, cells in clusters 460*b* and/or 460*c* may be weighted more heavily than cells in cluster 460*a*.

Figure 5:
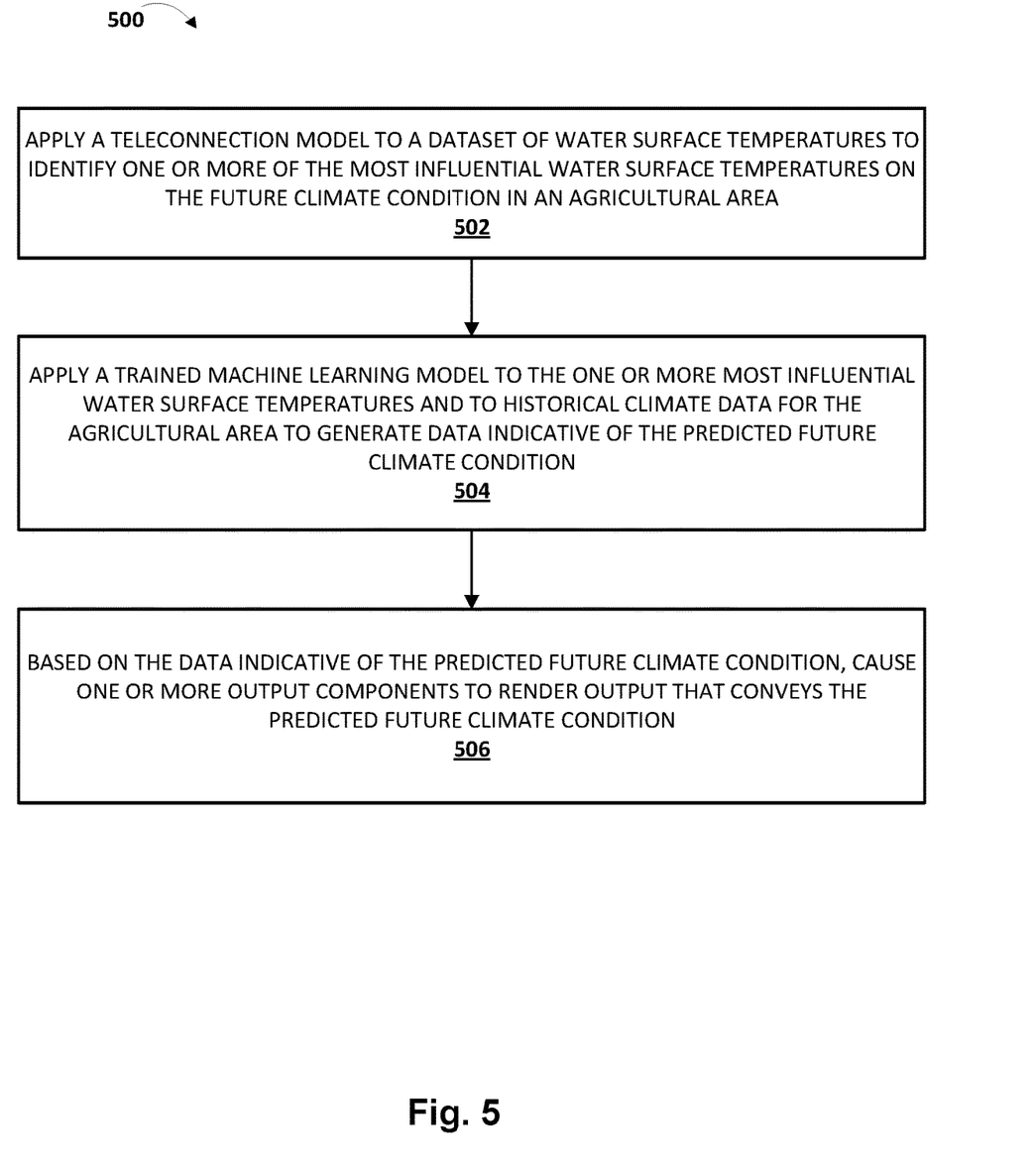
FIG. 5 is a flowchart of an example method in accordance with various implementations described herein.

FIG. 5 illustrates a flowchart of an example method 500 for predicting a future climate condition in an agricultural area. The operations of FIG. 5 can be performed by one or more processors, such as one or more processors of the various computing devices/systems described herein, such as by agricultural knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5. In the example of FIG. 5, water surface temperatures are used as a remote climate condition to predict the future climate condition in the agricultural area. However, this is not meant to be limiting, and other remote climate conditions, such as atmospheric pressure, water pressure, etc., may be used in addition to or instead of sea surface temperatures.

At block 502, the system, e.g., by way of teleconnection module 120, may apply a teleconnection model (e.g., a lookup table or causal model accessible to teleconnection module 120) to a dataset (e.g., remote climate database 118) of water surface temperatures to identify one or more of the most influential water surface temperatures on the future climate condition in the agricultural area of interest. In some implementations in which the downstream machine learning model is a time series model (e.g., 250), applying the teleconnection model to the dataset of water surface temperatures may include applying the teleconnection model a plurality of times to generate multiple sets of one or more of the most influential water surface temperatures, wherein each set of the multiple sets corresponds to a time lag prior to a target time for the predicted future climate condition.

As noted above, in some implementations, applying the teleconnection model generates multiple different sets of one or more candidate water surface temperatures, with the multiple sets corresponding to multiple different types of causal analysis. These different types of causal analysis may include but are not limited to convergent cross mapping, transfer entropy, and Granger causality. As was also noted previously, one or more of the most influential water surface temperatures may be selected from an intersection or union of these multiple different sets of one or more candidate water surface temperatures. In some implementations, the applying of block 502 may also include assigning more weight to one or more candidate water surface temperatures from one of the multiple different sets than one or more candidate water surface temperatures from another of the multiple different sets, e.g., based on empirical data associated with the agricultural area.

At block 504, the system, e.g., by way of inference module 124, may apply a trained machine learning model such as time-series model 250 to the one or more most influential water surface temperatures and to historical climate data for the agricultural area to generate data indicative of the predicted future climate condition. As noted previously, these predicted climate conditions may include, for instance, a measure of drought in the agricultural area (e.g., PDSI), humidity in the agricultural area, temperature in the agricultural area, and/or precipitation in the agricultural area, to name a few.

Based on the data indicative of the predicted future climate condition, at block 506, the system may cause one or more output components, e.g., of one or more client devices 106, to render output that conveys the predicted future climate condition. For example, a farmer could get a notification such as a pop-up window, email, text message, etc., that informs the farmer that in a month, their farm is likely going to experience a drought.

Figure 6:
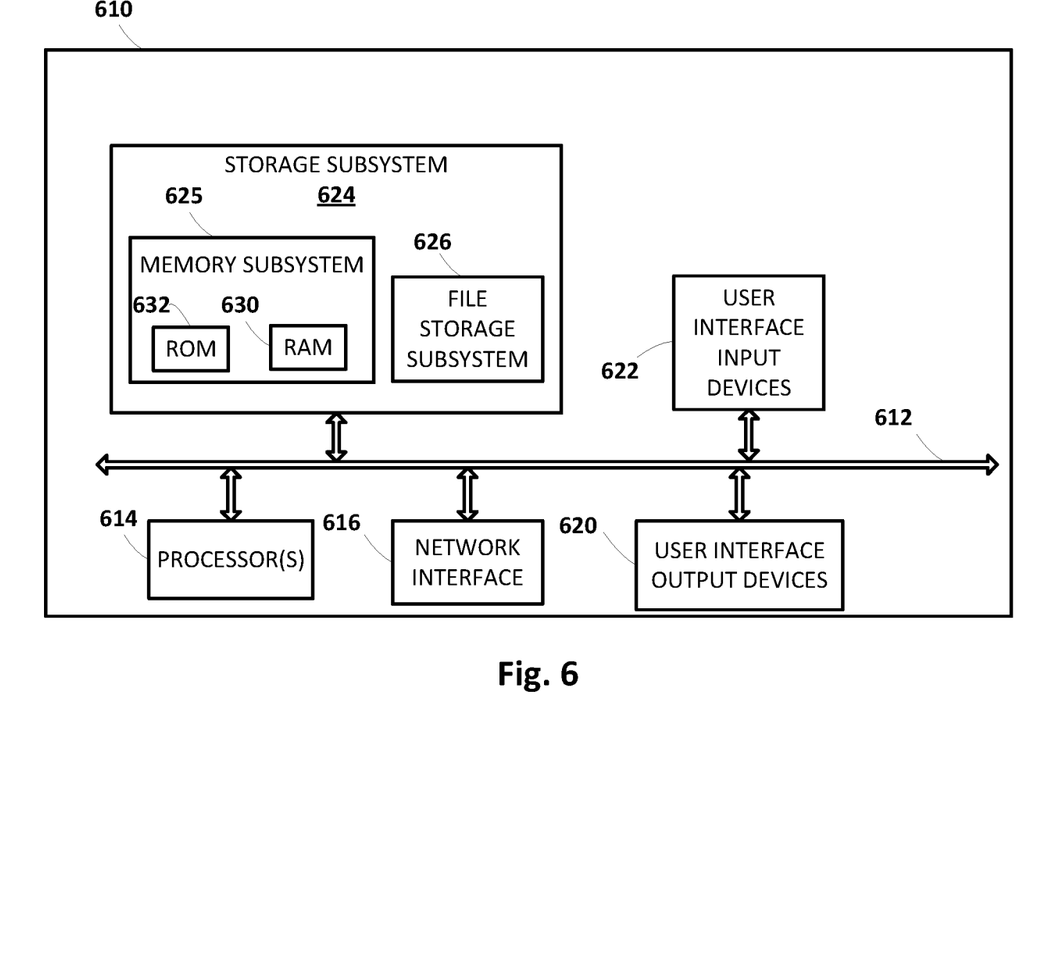
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1-3.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for predicting a future climate condition in an agricultural area, the method implemented using one or more processors and comprising:

applying one or more teleconnection models to a dataset of remote climate conditions to identify a first set of one or more remote climate conditions of the dataset that are most predictive of the future climate condition in the agricultural area, according to a first type of causal analysis;

applying one or more of the teleconnection models to the dataset of remote climate conditions to identify a second set of one or more remote climate conditions of the dataset that are most predictive of the future climate condition in the agricultural area, according to a second type of causal analysis that is different than the first type of causal analysis;

selecting, for inclusion in a third set of remote climate conditions, at least one remote climate condition from each of the first and second sets;

applying a trained machine learning model to the third set of remote climate conditions and to historical climate data for the agricultural area to generate data indicative of the predicted future climate condition; and based on the data indicative of the predicted future climate condition, causing one or more output components to render output that conveys the predicted future climate condition.

2. The method of claim 1, wherein the dataset of remote climate conditions comprises a dataset of water surface temperatures.

3. The method of claim 1, wherein the first and second types of causal analysis are selected from the group consisting of: convergent cross mapping, transfer entropy, and Granger causality.

4. The method of claim 1, wherein the selecting includes selecting the remote client conditions from an intersection of the multiple different sets of one or more candidate water surface temperatures.

5. The method of claim 1, wherein the selecting includes selecting the remote client conditions from a union of the multiple different sets of one or more candidate water surface temperatures.

6. The method of claim 1, further comprising assigning more weight to the at least one remote climate condition selected from one of the first and second sets.

7. The method of claim 6, wherein the assigning is based on empirical data associated with the agricultural area.

8. The method of claim 1, wherein the climate condition comprises one or more of:
- a measure of drought in the agricultural area;
- humidity in the agricultural area;
- temperature in the agricultural area; or
- precipitation in the agricultural area.

9. A system for predicting a future climate condition in an agricultural area, the system including one or more processors and memory storing instructions that cause the one or more processors to:
- apply one or more teleconnection models to a dataset of remote climate conditions to identify a first set of one or more remote climate conditions of the dataset that are most predictive of the future climate condition in the agricultural area, according to a first type of causal analysis;
- apply one or more of the teleconnection models to the dataset of remote climate conditions to identify a second set of one or more remote climate conditions of the dataset that are most predictive of the future climate condition in the agricultural area, according to a second type of causal analysis that is different than the first type of causal analysis;
- select, for inclusion in a third set of remote climate conditions, at least one remote climate condition from each of the first and second sets;
- apply a trained machine learning model to the third set of remote climate conditions and to historical climate data for the agricultural area to generate data indicative of the predicted future climate condition; and
- based on the data indicative of the predicted future climate condition, cause one or more output components to render output that conveys the predicted future climate condition.

10. The system of claim 9, wherein the dataset of remote climate conditions comprises a dataset of water surface temperatures.

11. The system of claim 9, wherein the first and second types of causal analysis are selected from the group consisting of: convergent cross mapping, transfer entropy, and Granger causality.

12. The system of claim 9, wherein the selecting includes selecting the remote client conditions from an intersection of the multiple different sets of one or more candidate water surface temperatures.

13. The system of claim 9, wherein the selecting includes selecting the remote client conditions from a union of the multiple different sets of one or more candidate water surface temperatures.

14. The system of claim 9, further comprising assigning more weight to the at least one remote climate condition selected from one of the first and second sets.

15. The system of claim 14, wherein the assigning is based on empirical data associated with the agricultural area.

16. The system of claim 9, wherein the climate condition comprises one or more of:
- a measure of drought in the agricultural area;
- humidity in the agricultural area;
- temperature in the agricultural area; or
- precipitation in the agricultural area.

17. A non-transitory computer-readable medium for predicting a future climate condition in an agricultural area, the medium comprising instructions that, in response to execution of the instructions by a processor, cause the processor to:
- apply one or more teleconnection models to a dataset of remote climate conditions to identify a first set of one or more remote climate conditions of the dataset that are most predictive of the future climate condition in the agricultural area, according to a first type of causal analysis;
- apply one or more of the teleconnection models to the dataset of remote climate conditions to identify a second set of one or more remote climate conditions of the dataset that are most predictive of the future climate condition in the agricultural area, according to a second type of causal analysis that is different than the first type of causal analysis;
- select, for inclusion in a third set of remote climate conditions, at least one remote climate condition from each of the first and second sets;
- apply a trained machine learning model to the third set of remote climate conditions and to historical climate data for the agricultural area to generate data indicative of the predicted future climate condition; and
- based on the data indicative of the predicted future climate condition, cause one or more output components to render output that conveys the predicted future climate condition.

18. The non-transitory computer-readable medium of claim 17, wherein the dataset of remote climate conditions comprises a dataset of water surface temperatures.

19. The non-transitory computer-readable medium of claim 17, wherein the first and second types of causal analysis are selected from the group consisting of: convergent cross mapping, transfer entropy, and Granger causality.

20. The non-transitory computer-readable medium of claim 17, wherein the selecting includes selecting the remote client conditions from an intersection of the multiple different sets of one or more candidate water surface temperatures.

* * * * *